United States Patent [19]
Yan et al.

[11] Patent Number: 5,538,932
[45] Date of Patent: *Jul. 23, 1996

[54] PREPARATION OF HIGH ACTIVITY, HIGH DENSITY ACTIVATED CARBON WITH ACTIVATABLE BINDER

[75] Inventors: Zhiquan Q. Yan, Mt. Pleasant, S.C.; John C. McCue, Covington, Va.; Edward D. Tolles, Charleston, S.C.

[73] Assignee: Westvaco Corporation, New York, N.Y.

[ * ] Notice: The term of this patent shall not extend beyond the expiration date of Pat. No. 5,324,703.

[21] Appl. No.: 449,811

[22] Filed: May 24, 1995

Related U.S. Application Data

[63] Continuation-in-part of Ser. No. 266,292, Jun. 27, 1994, which is a continuation-in-part of Ser. No. 95,755, Jul. 21, 1993, Pat. No. 5,324,703, which is a continuation-in-part of Ser. No. 929,166, Aug. 11, 1992, Pat. No. 5,250,491.

[51] Int. Cl.$^6$ .............................. B01J 20/02; B01J 20/30
[52] U.S. Cl. ............................................ 502/424; 502/425
[58] Field of Search .................... 502/424, 425, 502/426

[56] References Cited

U.S. PATENT DOCUMENTS

| 3,864,277 | 2/1975 | Kovach | 252/423 |
| 5,324,703 | 6/1994 | McCue et al. | 502/424 |

*Primary Examiner*—Shrive Beck
*Assistant Examiner*—Fred J. Parker
*Attorney, Agent, or Firm*—Terry B. McDaniel; Daniel B. Reece, IV; Richard L. Schmalz

[57] ABSTRACT

An improved method of manufacturing hard activated carbon pellets is disclosed in which a lignocellulose material is chemically activated to form a char and heated to a temperature above about 360° C. which char is ground and then agglomerated in a pin mixer followed by pelleting the agglomerated acid char in the presence of an activatable binder. The pelleted hard activated carbon is then subjected to a final heat activation to yield a product with high density and activity.

8 Claims, No Drawings

PREPARATION OF HIGH ACTIVITY, HIGH DENSITY ACTIVATED CARBON WITH ACTIVATABLE BINDER

This application is a continuation-in-part of co-pending application Ser. No. 08/266,292 filed on Jun. 27, 1994, which is a continuation-in-part of application Ser. No. 08/095,755 filed Jul. 21, 1993 (issued Jun. 28, 1994 as U.S. Pat. No. 5,324,703), which is, in turn, a continuation-in-part of application Ser. No. 07/929,166 filed Aug. 11, 1992 and which issued as U.S. Pat. No. 5,250,491 on Oct. 5, 1993.

BACKGROUND OF THE INVENTION

1. Field of the Invention

The present invention relates to activated carbon and methods for preparing same. Particularly, this invention relates to the preparation of gasoline adsorptive activated carbons and their use in emission control canisters for gasoline powered vehicles. More particularly, this invention relates to activated carbon derived from lignocellulosic material prepared by chemical activation, agglomeration, and shaping of the agglomerated carbon.

2. Description of the Prior Art

Activated carbon is a microcrystalline, nongraphitic form of carbon which has been processed to increase internal porosity. Activated carbons are characterized by a large specific surface area typically in the range of 500–2500 $m^2/g$, which permits its industrial use in the purification of liquids and gases by the adsorption of gases and vapors from gases and of dissolved or dispersed substances from liquids. Commercial grades of activated carbon are designated as either gas-phase or liquid-phase adsorbents. Liquid-phase carbons generally may be powdered, granular, or shaped; gas-phase, vapor-adsorbent carbons are hard granules or hard, relatively dust-free shaped pellets. The present invention relates to shaped (pelleted), gas-phase, vapor-adsorbent active carbons.

Generally, the larger the surface area of the activated carbon, the greater its adsorption capacity. The available surface area of activated carbon is dependent on its pore volume. Since the surface area per unit volume decreases as individual pore size increases, large surface area generally is maximized by maximizing the number of pores of very small dimensions and/or minimizing the number of pores of very large dimensions. Pore sizes are defined herein as micropores (pore width<1.8 nm), mesopores (pore width= 1.8–50 nm), and macropores (pore width>50 nm). Mesopores may be further divided between small mesopores (pore width=1.8–5 nm) and large mesopores (pore width=<5–50 nm).

The liquid adsorptive capacity of the activated carbon relies primarily on large mesopores and macropores. As noted above, high macropore content normally is detrimental to the activated carbon's density characteristics, particularly if the activated carbon is derived from a lignocellulosic material. Microporosity, which may contribute to density, is detrimental to the liquid adsorbent effectiveness of the activated carbon, on a carbon volume basis.

The vapor adsorptive capacity of the activated carbon, on the other hand, relies primarily on micropores and small mesopores; whereas, the macropores reduce the density and can be detrimental to the vapor adsorbent effectiveness of the activated carbon, on a carbon volume basis. The adsorption capacity and rate of adsorption depend to a large extent upon the internal surface area and pore size distribution.

Conventional chemically activated lignocellulose-based carbons generally exhibit macroporosity (macropore volume) of greater than 20% of the carbon particle total volume. Gas-phase activated carbon macroporosity of less than 20% of the carbon particle volume would be desirable. Likewise, a high percentage of mesoporosity (i.e., above 50% of total particle volume), particularly small mesoporosity, is desirable.

Due to environmental concerns and regulatory mandates, one of the largest single applications for gas-phase carbon is in gasoline vapor emission control canisters on automobiles. Evaporative emissions vented from both fuel tank and carburetor are captured by activated carbon.

Fuel vapors, vented when the fuel tank or carburetor is heated, are captured in canisters generally containing from 0.5 to 2 liters of activated carbon. Regeneration of the carbon is accomplished by using intake manifold vacuum to draw air through the canister. The air carries desorbed vapor into the engine where it is burned during normal operation. An evaporative emission control carbon should have suitable hardness, a high vapor working capacity, and a high saturation capacity. The working capacity of a carbon for gasoline vapor is determined by the adsorption-desorption capacity differential, by the volume of purge air which flows through the carbon canister, and by the extent to which irreversibly adsorbed, high molecular weight gasoline components accumulate on the carbon.

Wood-based carbons are relatively soft as compared to coal-based carbons. The ability to prepare an activated carbon of a higher density, higher hardness, and smaller median pore size from a material of a lower density, lower hardness, and large median pore size (lignocellulosic material) is taught in U.S. Pat. No. 4,677,086, which disclosure is incorporated herein by reference. An active granular wood-based carbon is ground to a fine powder, mixed with water and a bentonite clay binder, extruded to form cylindrical pellets, oven dried, and heat treated at 1,000° F. The uniform pellet form provides consistent particle size and a regular pellet shape which minimizes pressure drop in gas phase applications. Thus, the terms "high density" and "high activity" are used herein in a relative sense as the invention is limited to processing lignocellulosic material.

Also, U.S. Pat. No. 5,039,651 (which disclosure is also incorporated herein by reference) teaches densification of activated carbon product from cellulose materials including coconut shells, wood chips, and sawdust by pressing after initially heating to a relatively low temperature, followed by extrusion and calcination.

U.S. Pat. No. 5,206,207 (incorporated herein by reference) discloses activated carbons of high activity and relatively high density suitable for solvent and vapor capture and recovery prepared by chemically activating carbonaceous material fragments (i.e., "discrete particles"), heat plasticizing the particles to begin transition to thermoset, densifying the particles to "high density" by mechanical shaping (in a spheronizer), further heating the shaped particles to thermoset, and still further heating the thermoset shaped particles to 425°–650° C. Unfortunately, the spheronizing equipment limitations related to such process restrict capacity to below commercial production levels. The mechanical shaping in the plasticized state of the chemically activated carbon effectively "shifts" the particle pore dispersion by increasing the number of small mesopores and micropores at the expense of (i.e., by reducing the number of) macropores. This provides even higher activity (by increasing surface area in the desirable pore size range) and higher density (see Table I, below).

A more commercially feasible process of making activated carbons of high activity and relatively high density suitable for solvent and vapor capture and recovery is disclosed in U.S. Pat. No. 5,250,491 (incorporated herein by reference) which provides a chemical activation and agglomeration process for producing high activity gas-phase activated carbons without sacrificing improvements in density. U.S. Pat. No. 5,324,703, issued Jun. 28, 1994 from parent application Ser. No. 08/095,755 represents an improvement over the U.S. Pat. No. 5,250,491 process and product by including a pelleting (by extrusion) step before final heat activation to result in a shaped high activity and high density active carbon of improved hardness in the absence of employing a binder during the extrusion step. Upon scale-up of this technology, however, it was discovered that the temperature of the cooking process could not be controlled as easily as under laboratory conditions and, absent control of the temperature of the feed material to the pin mixer up to a temperature of below about 185° C., the extruded, finally activated product exhibited low hardness and reduced physical integrity in a solvent or vapor environment. Therefore, the object of the present invention is to produce a uniformly shaped high activity, high density active carbon suitable for solvent and vapor capture and recovery exhibiting high hardness and enhanced physical integrity using a pin mixer without the observed feed material temperature limitations.

SUMMARY OF THE INVENTION

The above object of the invention is achieved and a uniformly shaped high activity and high density carbon of high hardness and improved physical integrity is prepared even at pin mixer material feed temperatures above about 185° C. by the chemical activation of a carbonaceous material, preferably lignocellulosic material, with a chemical activation agent in a manner to produce a plastic intermediate product and processing the intermediate product in the presence of moisture and an activatible binder material in a pin mixer which densities the material effectively to minimize the macropore structure of the activated carbonaceous material. The densifted material is then formed into cylindrical pellets by extrusion to result in an improved active carbon pellet of increased hardness and improved physical integrity upon final activation. Final activation is accomplished by heating the pelleted material at a controlled rate, preferably to 450°–550° C.

The novel high activity, high density gas-phase activated carbons produced are characterized by butane working capacities from above 15 to about 25 g/100 cm$^3$, preferably from about 17 to about 25 g/100 cm$^3$, and more preferably from about 19 to about 25 g/100 cm$^3$, a butane activity of from about 60 to about 80 g/100 g, preferably from about 65 to about 80 g/100 g, and more preferably from about 70 to about 80 g/100 g, and a density of from about 0.25 to about 0.40 g/cm$^3$, preferably from about 0.27 to about 0.40 g/cm$^3$, more preferably from about 0.30 to about 0.40 g/cm$^3$.

Preferably, such an activated carbon material also exhibits a mesopore content of greater than about 50%, preferably greater than about 60%, and more preferably greater than about 70%, based on the total particle volume, and a macropore content of less than 20%, preferably less than 18%, and more preferably less than 15%, based on the total particle volume.

DESCRIPTION OF THE PREFERRED EMBODIMENTS

Recently, a unique process for preparing granular activated carbon with high activity and high density was developed as disclosed in U.S. Pat. No. 5,206,207. The process includes preparing a plastic acid char, grinding the char into powder, shaping and densifying the char into granular particles by agglomeration, and activating the granules to produce high activity, high density, granular activated carbon. One particular method for producing the activated carbon product involves blending a 3:1-1:1 mixture respectively of a chemical activating agent, preferably phosphoric acid or zinc chloride, with a lignocellulose material, preferably wood chips, sawdust, or wood dust (or wood flour), with agitation for up to one hour, preferably at a temperature of from about 35° C. to about 95° C., after which the mixture is spread on a flat surface in layers of a thickness of from about 6 mm to about 25 mm. The mixture can be subjected to a further heat treatment, preferably at a temperature of from about 35° C. to about 95° C. for a time sufficient that the mixture material begins a transition from a highly plastic phase to begin to thermoset. Then the material is subjected to successive steps of pulverizing (if larger materials like wood chips or sawdust are the precursors) into fine particles and then re-agglomerating the particles to granular size and shape (generally spherical). Optionally, the shaped material may be heat treated again at from about 35° C. to about 120° C. to complete the densification by completing the thermosetting process. Upon complete elimination of plasticity, the temperature is gradually increased to from about 450° C. to about 600° C.

Typical product characteristics resulting from this prior process are shown in Table I.

TABLE I

| Activated Carbon Product Characteristics | |
| --- | --- |
| Butane Working Capacity | 18.1 g/100 cm$^3$ |
| Butane Activity | 69.7 g/100 g |
| Surface Area | 2420 m$^2$/g |
| Apparent Density | 0.29 g/cm$^3$ |
| Particle Density | 0.48 g/cm$^3$ |
| Mesopore Content | 60% |
| Macropore Content | 12% |

The granular product of this method consists of particles with a relatively broad range of sizes which are normally screened to a narrower range (e.g., 10×25 mesh with 80 wt % yield) to accommodate particular applications.

Co-pending application Ser. No. 08/095,755 discloses an alternative and preferred commercial process for producing the high density, high activity carbon employing a pin mixer and an additional shaping step to be employed before activation to reform granular particles of acid char into cylindrical pellets. This is accomplished by uniformly shaping the densifted (pulverized and re-agglomerated), spheroidal shaped, high density carbon by extrusion prior to activation. An advantage of pelleting is that the range of product particle size is narrow and there is a very high yield of product of the target size. In addition, particle size can be easily adjusted and large particle sizes can be produced which are much more difficult to make by other means. The benefit of large uniform particles is dramatically reduced pressure drop for packed bed applications. An additional benefit of the pelleted product, it was discovered, is the improved product hardness over the prior art granular particles.

As noted above, although this procedure consistently gives a product of a high BWC and desired porosity distribution, product hardness and physical integrity proved to be acceptable only when the pin mixer feed material is at a temperature of below about 185° C. In the commercial scale up of the process, it proved difficult to control the feed material temperature within this range. At higher temperatures the material tends to thermoset, and the resultant loss in plasticity and cohesiveness resulted in unsatisfactory product hardness and physical integrity. Initial experimentation with adding binder material to recover these properties resulted in unacceptable loss of activity and butane working capacity (BWC). However, it was surprisingly discovered that by employing an activatible material as binder and by adding the activatible binder material to the pin mixer feed material to be processed in the pin mixer, rather than conventional addition just ahead of the extruder, improved product hardness and physical integrity were achieved without loss of product activity. This discovery allows extended use of the pin mixer based process which earlier was limited to processing materials within a narrow temperature range.

In particular, an acid char is produced by the chemical activation of a carbonaceous material, preferably lignocellulosic material, with a chemical activation agent and then heated in a manner to produce an intermediate product which is subjected to shaping and densification by agglomeration in a high speed agglomeration device, such as a pin mixer, effectively to minimize the macropore structure of the activated carbonaceous material. (The acid char optionally may be pulverized in a separate step prior to agglomeration in the pin mixer, but such is not necessary as the early stage of the pin mixer can effectively perform this function before the granular nature of the activated material is "reconstructed" by agglomeration to form a basically spheroidal shaped pellet in the later stage of the pin mixer.) After initial pulverization (either internal or external to the pin mixer), the pin mixer introduces a large amount of energy into the material that homogenizes the chemically activated carbonaceous material and causes the material to become plastic and cohesive. In the event that the material treated in the pin mixer reaches temperatures above 185° C., whether before or after introduction to the pin mixer, and completes transition to thermoset, introduction of an activatible binder material in the pin mixer to be agglomerated with the pulverized carbonaceous material is necessary to produce a high hardness final shaped product with enhanced physical integrity in a solvent or vapor environment over previous similarly high density and high activity active carbons. The final shaping of the product is performed by extruding the heat treated material to form cylindrical pellets. Extrusion is followed by increasing the temperature of the shaped product at a controlled rate to from about 400° C. to about 600° C., preferably about 450°–550° C., more preferably about 500° C. The increase in particle hardness and physical integrity without a loss in activity is surprising and unexpected.

The raw material precursor in the invention chemical activation may be any of the carbonaceous material of plant or mineral origin earlier recited. Preferred precursors primarily are lignocellulosic materials of plant origin and include wood-based materials such as wood chips, wood flour, and sawdust, as well as nut pits and nut shells such as coconut shell. Chemical activation agents may include: alkali metal hydroxides, carbonates, sulfides, and sulfates; alkaline earth carbonates, chlorides, sulfates, and phosphates; phosphoric acid; polyphosphoric acid; pyrophosphoric acid; zinc chloride; sulfuric acid; and oleum. Preferred among these are phosphoric acid and zinc chloride. Most preferred is phosphoric acid.

Acid/sawdust blending, cooking, and agglomeration steps can be performed as described in the previously referenced patents. The success of the pelletization process depends upon attaining the correct degree of reaction during the cooking step and modifying the cooked char physically and chemically during the agglomeration step to yield a material which has the necessary plasticity for pelletization. A wide range of processing conditions has been employed to make cooked/agglomerated material which is satisfactory for this purpose. If no binders are added, the acid char processed in a pinmixer should be pelleted while in the plastic condition, and the formed pellets, with or without an additional heat treatment (curing) step, is activated to obtain hard pelleted carbon with high density and high activity. As noted, if the acid char processed in the pin mixer has transitioned to thermoset, an activatible binder material should be added to the pin mixer. If the acid char is pre-pulverized prior to pin mixer addition, the binder should be added to the pin mixer along with the pulverized acid char feed at a binder-to-char weight basis ratio of 0.05–0.1:1. If, on the other hand, the acid char is to be pulverized in the pin mixer prior to agglomeration, the binder material should be added to the pin mixer at a point between pulverization and agglomeration at a binder-to-char weight basis ratio of 0.05–0.1:1. In either case, the preferred binder-to-char ratio is 0.08:1 and the pin mixed product is extruded to produce a pellet shaped product.

The final activation of the pelleted material typically occurs in a rotary kiln in which the temperature of the thermoset shaped mixture is raised to from about 450° C. to about 600° C. Alternatively, for continuous processing, the cooking/activation may be accomplished on a belt oven. This basic process normally is followed with washing and drying steps.

In the following examples, the hardness of the granular product was determined by ASTM D3802-79 (ball pan hardness) procedure. The hardness of pellet carbon was determined by the Ford Strength test (known in the industry) which is a modified version of the original ASTM method specifically for 2 mm extruded carbons.

EXAMPLES

Trials on binder addition to the pin mixer along with the acid char material, prepared as described in the specification above, for producing hard grandular carbon were conducted to determine the effect of such addition in improving hardness of a high activity carbon product. These tests were performed on a batch pin mixer (Turbulator 12TB34) using Orzan A (NH$_4$ Lignosulfonate by ITT Rayonier) as a binder. Results are summarized in Table II below.

TABLE II

| Feed Material | Pin Mixer Run # and Lab Kiln Act # | Binder/Char Ratio (w/w) | ASTM Hardness (10 × 25 mesh) | A. D. g/cc | Particle Density incl <35 μm pore; g/cc | BWC g/100 cc | Notes |
| --- | --- | --- | --- | --- | --- | --- | --- |
| ground char 175° C. 0.26% metals | M#103 RK92-960 | no | 60 | 0.309 | | 16.0 | |
| ground char 205° C. 0.3% metals | T#355 RK93-1494 | no | 9 | .307 | 0.469 | 15.7 | few cracks |
| | T#356 RK93-1492 | 0.08:1 | 57 | .352 | .0536 | 16.4 | no cracks |

*4 × 10 Mesh

Compared to binderless pin mixer product, product with binders had higher ASTM hardness (over the minimum target of 40 for the granular product in some cases), especially when cooked-char temperature was too high (>185° C.) for pin mixer to produce hard granular product. It indicated that binder could be used as a means to improve high-temperature (>185° C.) plant char pin mixability and product hardness. Thermoset at lower temperature after pin mixing helped increase product hardness. To further increase hardness, more tests are needed including use of other types of binders.

In the case of granular activated carbon, the density is an important feature of the effectiveness of the adsorbent, as many applications of granular or shaped activated carbon involve a static active carbon bed of fixed volumetric size. The apparent density of the invention activated carbon is measured according to the method ASTM D 2854. Measurements of apparent density of granular carbon in a packed bed of particles reported herein were based on 10×25 mesh carbon materials. Measurements of apparent density of pelleted carbon in a packed bed of particles herein were based on pellets produced from a 2.5 mm die plate.

The density of the individual carbon particles was determined by displacement of mercury using a Micromeritics Pore Sizer 9300 instrument. The density is based on the mass of a particle and its volume including pores smaller than 35 micrometers.

The foregoing method is capable of producing the invention high activity, high density activated carbon from relatively low density lignocellulose materials, such as wood chips, wood flour, and sawdust.

What is claimed is:

1. A method for preparing a high activity, high density activated carbon derived from lignocellulose material comprising the steps of:

(a) blending together fragments of the lignocellulosic material with a chemical activation agent selected from the group consisting of phosphoric acid and zinc chloride to produce an acid char;

(b) heat treating the acid char at a temperature greater than 185° C. to effect both plasticization and drying of the acid char material to a moisture content of up to about 25% by weight;

(c) densifying the heat treated acid char material by sequentially pulverizing the material into fine particles followed by agglomeration of the fine particles in the presence of moisture and an activatable binder material, at a binder-to-char weight basis ratio of from about 0.05:1 to about 0.1:1, to form generally high density, spherical shaped, agglomerated carbon in a pin mixer;

(d) shaping, by extruding, a mass of the high density, spherical, agglomerated carbon to produce extruded high density carbon pellets; and (e) activating the high density carbon pellets by heating gradually up to a final activation temperature of from about 400° C. to about 600° C., wherein the high activity, high density activated carbons produced are characterized by a butane working capacity from above 15 g/100 cm$^3$ to about 25 g/100 cm$^3$ and a density of from about 0.25 to about, 0.40 g/cm$^3$.

2. The method of claim 1 wherein the lignocellulosic material is selected from the group consisting of wood chips, wood flour, and sawdust.

3. The method of claim 1 wherein the weight ratio of chemical activating agent to lignocellulosic material is from about 3:1 to about 1:1, respectively.

4. The method of claim 3 wherein the ratio is about 1.6:1.

5. The method of claim 1 wherein the weight binder-to-char ratio is about 0.08:1.

6. The method of claim 1 wherein the product of step (d) is subjected to a heat treatment of from about 35° to about 120° C. prior to the activation of step (e).

7. The method of claim 1 wherein the activatable binder material is a lignosulfonate.

8. The method of claim 7 wherein the lignosulfonate is ammonium lignosulfonate.

* * * * *